United States Patent
Hsu et al.

(10) Patent No.: US 8,431,498 B2
(45) Date of Patent: Apr. 30, 2013

(54) MGO—AL$_2$O$_3$—SIO$_2$-BASED CRYSTALLIZABLE GLASS AND CRYSTALLIZED GLASS, AND MANUFACTURING METHOD THEREOF

(75) Inventors: Kuo-Chuan Hsu, Hsinchu (TW); Chao Qu, Zhejiang (CN)

(73) Assignees: Huzhou Ta Hsiang Glass Products Co., Ltd., Zhejiang (CN); Ta Hsiang Containers Inc. Do., Ltd., Hsinchu County (TW)

( * ) Notice: Subject to any disclaimer, the term of this patent is extended or adjusted under 35 U.S.C. 154(b) by 0 days.

(21) Appl. No.: 12/911,664

(22) Filed: Oct. 25, 2010

(65) Prior Publication Data

US 2011/0111944 A1    May 12, 2011

(30) Foreign Application Priority Data

Nov. 6, 2009 (JP) .................. 2009-254932

(51) Int. Cl.
*C03C 10/04* (2006.01)
(52) U.S. Cl.
USPC .................. 501/5; 501/6; 501/9; 501/155

(58) Field of Classification Search .................. 501/5, 6, 501/9, 155
See application file for complete search history.

(56) References Cited

U.S. PATENT DOCUMENTS 5,061,307 A    10/1991    Matano et al.

FOREIGN PATENT DOCUMENTS

| CN | 1053047 A | 7/1991 |
|----|-----------|--------|
| CN | 1880251 A | 12/2006 |
| JP | 07010597  | * 1/1995 |
| JP | 2007126299 | * 5/2007 |

* cited by examiner

*Primary Examiner* — Karl Group

(57) ABSTRACT

The invention provides a crystallizable glass, a crystallized glass, and manufacturing methods thereof. The crystallizable glass can be crystallized in a short period of time, and can maintain its glass shape and its surface condition during a crystallization process. The crystallized glass has good mechanical strength, an adequate thermal expansion coefficient that allows the crystallized glass to be used as a construction material, less content of alkali-metal oxides, and good chemical durability. The MgO—Al$_2$O$_3$—SiO$_2$-based crystallizable glass and crystallized glass contain, by mass percent, 55.0-65.0% SiO$_2$, 8.0-14.0% Al$_2$O$_3$, 10.0-20.0% MgO, 1.5-6.0% CaO, 1.0-2.2% Li$_2$O, 0.7-3.0% Na$_2$O, 2.5-4.0% K$_2$O, and 1.5-3.0% F.

2 Claims, No Drawings

US 8,431,498 B2

MGO—AL$_2$O$_3$—SIO$_2$-BASED CRYSTALLIZABLE GLASS AND CRYSTALLIZED GLASS, AND MANUFACTURING METHOD THEREOF

CLAIM OF PRIORITY

This application claims the priority benefit of Japanese Application Serial Number JP2009-254932, filed on Nov. 6, 2009. All disclosure of the Japanese application is incorporated herein by reference.

TECHNICAL FIELD

This invention relates to a MgO—Al$_2$O$_3$—SiO$_2$-based crystallizable glass and a MgO—Al$_2$O$_3$—SiO$_2$-based crystallized glass, and the manufacturing methods thereof.

BACKGROUND ART

A crystallized glass, which is used as an exterior and interior decorative material for buildings or used as a surface material for home desks and office desks, is required to have high chemical durability and mechanical strength and it gives a nice appearance at low prices. For such crystallized glass, various crystallized glasses have been proposed.

In one representative example, after a melted glass is shaped into a desired form and becomes a crystallizable glass, the crystallizable glass undergoes a crystallization heating process to form a crystallized glass. At least one or more crystals of K(Li,Al)$_3$(Al,Si)$_4$O$_{10}$(OH,F)$_2$ (lepidolite), KLiMg$_2$Si$_4$O$_{10}$F$_2$ (tainiolite), Li$_2$Al$_2$Si$_3$O$_{10}$, LiAlSi$_3$O$_8$, Li$_x$Al$_x$Si$_{3-x}$O$_6$ (virgilite), β-LiAlSi$_2$O$_6$ (β-spodumene solid solution, Li$_2$O—Al$_2$O$_3$-nSiO$_2$(n≧4)), Mg$_2$Al$_4$Si$_5$O$_{18}$ (µ-cordierite), KMg$_3$(Si$_3$AlO$_{10}$)(OH)$_2$ (phlogopite), and KMgAlSi$_4$O$_{10}$(OH)$_2$ (leucophyllite) can be precipitated from the crystallizable glass as a primary crystal, thereby transforming the crystallizable glass into a crystallized glass, which has good chemical durability and mechanical strength. (For example, refer to Patent Document 1.)

On the other hand, a continuous forming production method using a continuous forming process equipment has served as a manufacturing method for crystallized glass, for example, as described in Patent Document 2. With this production method, the conventional annealing step performed before crystallization can be eliminated, thereby simplifying the manufacturing process, so as to reach the cost reduction goal.

Patent Document 1: JP-2007-126299
Patent Document 2: JP-2005-041726

DISCLOSURE OF THE INVENTION

Problems to be Solved by the Invention

However, for the crystallized glass disclosed in Patent Document 1, since the thermal expansion coefficient of its primary crystal is not sufficiently large, the crystallized glass may be inadequate to be used as a construction material when the difference between its thermal expansion coefficient and those of other construction materials used with this crystallized glass (such as concrete) is too large.

Furthermore, since the glass matrix of the crystallized glass is prone to soften, flow and deform during the crystallization heating process for transforming a crystallizable glass into a crystallized glass, the continuous forming production method using the continuous forming process equipment disclosed in Patent Document 2 is inadequate to be used.

One object of the invention is to solve various problems in the aforesaid conventional art and reach the following goals. Specifically, one object of the invention is to provide a crystallizable glass, which can be crystallized in a short period of time, can maintain its glass shape and its surface condition during the crystallization process, and is adequate for the aforesaid continuous forming production method; and a crystallized glass, which has good mechanical strength, adequate thermal expansion coefficient that allows the crystallized glass to be used as a construction material, less content of alkali-metal oxides, and good chemical durability. In addition, another object of the invention is to provide the methods for manufacturing the crystallizable glass and crystallized glass.

Means to Solve the Problems

According to the results obtained by the inventors through diligent studies, it has been found that the following methods of the invention can achieve the aforesaid objects.

The specific means to achieve the aforesaid objects are as follows:

(1) A MgO—Al$_2$O$_3$—SiO$_2$-based crystallizable glass, which is characterized by containing, by mass percent, 55.0-65.0% SiO$_2$, 8.0-14.0% Al$_2$O$_3$, 10.0-20.0% MgO, 1.5-6.0% CaO, 1.0-2.2% Li$_2$O, 0.7-3.0% Na$_2$O, 2.5-4.0% K$_2$O, and 1.5-3.0% F.

(2) The MgO—Al$_2$O$_3$—SiO$_2$-based crystallizable glass recited in the above (1), which is characterized in that lepidolite or a lithium-containing waste is used as a raw material for the crystallizable glass, in which an amount of the lepidolite or the lithium-containing waste is 25-50% by mass of all raw materials used for the crystallizable glass, and the lepidolite or the lithium-containing waste contains, by mass percent, 50.0-60.0% SiO$_2$, 20.0-30.0% Al$_2$O$_3$, 0-0.5% MgO, 3.0-5.0% Li$_2$O, 1.0-3.0% Na$_2$O, 6.0-9.0% K$_2$O, 4.0-6.0% F, 0-0.2% P$_2$O$_5$, 1.0-2.0% Rb$_2$O, 0.1-0.5% Cs$_2$O, 0.2-0.8% MnO$_2$, and 0.1-0.4% Fe$_2$O$_3$.

(3) A MgO—Al$_2$O$_3$—SiO$_2$-based crystallized glass, which is characterized by containing, by mass percent, 55.0-65.0% SiO$_2$, 8.0-14.0% Al$_2$O$_3$, 10.0-20.0% MgO, 1.5-6.0% CaO, 1.0-2.2% Li$_2$O, 0.7-3.0% Na$_2$O, 2.5-4.0% K$_2$O, and 1.5-3.0% F.

(4) The MgO—Al$_2$O$_3$—SiO$_2$-based crystallized glass recited in the above (3), which is characterized in that lepidolite or a lithium-containing waste is used as a raw material for the crystallized glass, in which an amount of the lepidolite or the lithium-containing waste is 25-50% by mass of all raw materials used for the crystallized glass, and the lepidolite or the lithium-containing waste contains, by mass percent, 50.0-60.0% SiO$_2$, 20.0-30.0% Al$_2$O$_3$, 0-0.5% MgO, 3.0-5.0% Li$_2$O, 1.0-3.0% Na$_2$O, 6.0-9.0% K$_2$O, 4.0-6.0% F, 0-0.2% P$_2$O$_5$, 1.0-2.0% Rb$_2$O, 0.1-0.5% Cs$_2$O, 0.2-0.8% MnO$_2$, and 0.1-0.4% Fe$_2$O$_3$.

(5) The MgO—Al$_2$O$_3$—SiO$_2$-based crystallized glass recited in the above (3) or (4), which is characterized by comprising at least one or more crystals of Ca(Mg, Al)(Si, Al)$_2$O$_6$ (diopside), MgSiO$_3$(enstatite), MgSiO$_3$ (clinoenstatite), KCa$_4$Si$_8$O$_{20}$(OH).8H$_2$O(hydroxyapophyllite), K(Li,Al)$_3$(Si,Al)$_4$O$_{10}$ (lepidolite-3T), K(Si$_3$Al)O$_8$(sanidine), KMg$_3$(Si$_3$Al)O$_{10}$(OH)$_2$(biotite-1M), KMg$_3$(Si$_3$Al)O$_{10}$(OH)$_2$ (phlogopite-2M1), and KAl$_2$Si$_3$AlO$_{10}$(OH)$_2$(muscovite-1M).

(6) The MgO—Al$_2$O$_3$—SiO$_2$-based crystallized glass recited in the above (5), which is characterized by being obtained by precipitating at least one or more crystals of Ca(Mg, Al)(Si,Al)$_2$O$_6$(diopside), MgSiO$_3$(enstatite), MgSiO$_3$ (clinoenstatite), KCa$_4$Si$_8$O$_{20}$(OH).8H$_2$O (hydroxyapophyllite), K(Li,Al)$_3$(Si,Al)$_4$O$_{10}$ (lepidolite-3T), K(Si$_3$Al)O$_8$ (sanidine), KMg$_3$(Si$_3$Al)O$_{10}$(OH)$_2$(biotite-1M), KMg$_3$(Si$_3$Al)O$_{10}$(OH)$_2$ (phlogopite-2M1), and KAl$_2$Si$_3$AlO$_{10}$(OH)$_2$(muscovite-1M) from the MgO—Al$_2$O$_3$—SiO$_2$-based crystallizable glass recited in the above (1) and (2).

(7) A method for manufacturing a MgO—Al$_2$O$_3$—SiO$_2$-based crystallizable glass, which is characterized by comprising a step A, preparing a mixture of glass raw materials containing, by mass percent, 55.0-65.0% SiO$_2$, 8.0-14.0% Al$_2$O$_3$, 10.0-20.0% MgO, 1.5-6.0% CaO, 1.0-2.2% Li$_2$O, 0.7-3.0% Na$_2$O, 2.5-4.0% K$_2$O, and 1.5-3.0% F; a step B, melting the mixture obtained in the step A into a melted glass; and a step C, shaping the melted glass obtained in the step B.

(8) The method for manufacturing a MgO—Al$_2$O$_3$—SiO$_2$-based crystallizable glass recited in the above (7), which is characterized in that the above step A includes a step A-1, stirring lepidolite or a lithium-containing waste, wherein the lepidolite or the lithium-containing waste contains, by mass percent, 50.0-60.0% SiO$_2$, 20.0-30.0% Al$_2$O$_3$, 0-0.5% MgO, 3.0-5.0% Li$_2$O, 1.0-3.0% Na$_2$O, 6.0-9.0% K$_2$O, 4.0-6.0% F, 0-0.2% P$_2$O$_5$, 1.0-2.0% Rb$_2$O, 0.1-0.5% Cs$_2$O, 0.2-0.8% MnO$_2$, and 0.1-0.4% Fe$_2$O$_3$; and a step A-2, preparing the mixture of glass raw materials by mixing, by stirring, the stirred product obtained in the step A-1 with other glass raw materials, wherein the stirred product is 20-50% by mass of the mixture of glass raw materials.

(9) A method for manufacturing a MgO—Al$_2$O$_3$—SiO$_2$-based crystallized glass, which is characterized by comprising a step A, preparing a mixture of glass raw materials containing, by mass percent, 55.0-65.0% SiO$_2$, 8.0-14.0% Al$_2$O$_3$, 10.0-20.0% MgO, 1.5-6.0% CaO, 1.0-2.2% Li$_2$O, 0.7-3.0% Na$_2$O, 2.5-4.0% K$_2$O, and 1.5-3.0% F; a step B, melting the mixture obtained in the step A into a melted glass; a step C, shaping the melted glass obtained in the step B to give a crystallizable glass; and a step D, performing a crystallization heating process on the crystallizable glass obtained in the step C.

(10) The method for manufacturing a MgO—Al$_2$O$_3$—SiO$_2$-based crystallized glass recited in the above (9), which is characterized in that the above step A includes a step A-1, stirring lepidolite or a lithium-containing waste, wherein the lepidolite or the lithium-containing waste contains, by mass percent, 50.0-60.0% SiO$_2$, 20.0-30.0% Al$_2$O$_3$, 0-0.5% MgO, 3.0-5.0% Li$_2$O, 1.0-3.0% Na$_2$O, 6.0-9.0% K$_2$O, 4.0-6.0% F, 0-0.2% P$_2$O$_5$, 1.0-2.0% Rb$_2$O, 0.1-0.5% Cs$_2$O, 0.2-0.8% MnO$_2$, and 0.1-0.4% Fe$_2$O$_3$; and a step A-2, preparing the mixture of glass raw materials by mixing, by stirring, the stirred product obtained in the step A-1 with other glass raw materials, wherein the stirred product is 20-50% by mass of the mixture of glass raw materials.

(11) The method for manufacturing a MgO—Al$_2$O$_3$—SiO$_2$-based crystallized glass recited in the above (9) or (10), which is characterized in that the above step D includes precipitating at least one or more crystals of Ca(Mg,Al)(Si,Al)$_2$O$_6$(diopside), MgSiO$_3$(enstatite), MgSiO$_3$ (clinoenstatite), KCa$_4$Si$_8$O$_{20}$(OH).8H$_2$O (hydroxyapophyllite), K(Li,Al)$_3$(Si,Al)$_4$O$_{10}$ (lepidolite-3T), K(Si$_3$Al)O$_8$(sanidine), KMg$_3$(Si$_3$Al)O$_{10}$(OH)$_2$(biotite-1M), KMg$_3$(Si$_3$Al)O$_{10}$(OH)$_2$(phlogopite-2M1), and KAl$_2$Si$_3$AlO$_{10}$(OH)$_2$(muscovite-1M) by performing the crystallization heating process.

Effect of the Invention

The invention provides a crystallizable glass, which can be crystallized in a short period of time, can maintain its glass shape and its surface condition during the crystallization process, and is adequate for the aforesaid continuous forming production method; and a crystallized glass, which has good mechanical strength, adequate thermal expansion coefficient that allows the crystallized glass to be used as a construction material, less content of alkali-metal oxides, and good chemical durability. Furthermore, the invention also provides the methods of manufacturing the crystallizable glass and crystallized glass.

EMBODIMENTS OF THE INVENTION

A. Crystallizable Glass and Crystallized Glass

A crystallizable glass and a crystallized glass according to the invention are characterized by containing, by mass percent, 55.0-65.0% SiO$_2$, 8.0-14.0% Al$_2$O$_3$, 10.0-20.0% MgO, 1.5-6.0% CaO, 1.0-2.2% Li$_2$O, 0.7-3.0% Na$_2$O, 2.5-4.0% K$_2$O, and 1.5-3.0% F.

The reason regarding defining the above percentage composition for the crystallizable glass and crystallized glass according to the invention is described hereinafter. In the following, "%" indicates "mass percent", if not otherwise specified.

A content of SiO$_2$ is 55.0-65.0%, preferably 55.0-60.0%. When the content of SiO$_2$ is less than 55.0%, the chemical durability of the crystallized glass may be deteriorated, and the glass is prone to deformation during the crystallization heating process. On the other hand, when the content of SiO$_2$ is more than 65.0%, the melting point of the glass becomes higher, thereby causing possible negative effects upon the production and causing the glass to crack or break during the crystallization heating process.

A content of Al$_2$O$_3$ is 8.0-14.0%, preferably 10.0-14.0%. When the content of Al$_2$O$_3$ is less than 8.0%, it may become difficult to crystallize the glass. In addition, it is possible to cause the glass to crack or break during the crystallization heating process. On the other hand, when the content of Al$_2$O$_3$ is more than 14.0%, it becomes difficult to melt the glass, and the devitrification temperature of the glass may be increased. In addition, it is possible to cause the glass to crack or break during the crystallization heating process.

A content of MgO is 10.0-20.0%, preferably 10.0-15.0%. When the content of MgO is less than 10.0%, the melting point of the glass becomes higher, so that it may become difficult to crystallize the glass, and it may be difficult to precipitate the crystals of MgSiO$_3$ (enstatite) and MgSiO$_3$ (clinoenstatite). Furthermore, it becomes difficult to maintain the glass shape while the glass is prone to deformation during the crystallization heating process. In addition, it is possible to cause the glass to crack or break during the crystallization heating process. On the other hand, when the content of MgO is more than 20.0%, the devitrification temperature of the glass may be increased.

A content of CaO is 1.5-6.0%, preferably 2.0-5.0%. When the content of CaO is less than 1.5%, it is difficult to precipitate the crystals of Ca(Mg,Al)(Si,Al)$_2$O$_6$(diopside). In addition, it becomes difficult to maintain the glass shape while the glass is prone to deformation during the crystallization heating process. Furthermore, it is possible to cause the glass to crack or break during the crystallization heating process. On the other hand, when the content of CaO is more than 6.0%, it is prone to precipitate crystals other than diopside.

A content of Li$_2$O is 1.0-2.2%, preferably 1.0-1.8%. Li$_2$O acts as an effective co-solvent; however, if its content is less than 1.0%, its co-solvent effect becomes weaker and the solubility becomes lower. In addition, flat glass can become poorly formed. Moreover, when its content is less than 1.0%, it is difficult to precipitate the crystals of $K(Li,Al)_3$ $(Si,Al)_4O_{10}$ (lepidolite-3T). On the other hand, when the content of $Li_2O$ is more than 2.2%, it is prone to precipitate β-quartz solid solution or β-spodumene solid solution; however, the resulting crystallized glass may be inadequate to be used as a construction material because the thermal expansion coefficients of these types of crystals are not sufficiently large.

A content of $Na_2O$ is 0.7-3.0%. $Na_2O$ acts as an effective co-solvent; however, if its content is less than 0.7%, its co-solvent effect becomes weaker. If its content is more than 3.0%, it becomes difficult to maintain the glass shape while the glass is prone to deformation during the crystallization heating process. In addition, the chemical durability of the glass can also be deteriorated.

A content of $K_2O$ is 2.5-4.0%. $K_2O$ acts as an effective co-solvent; however, when its content is less than 2.5%, its co-solvent effect becomes weaker. If its content is more than 4.0%, it becomes difficult to maintain the glass shape while the glass is prone to deformation during the crystallization heating process. Furthermore, the chemical durability of the glass can also be deteriorated.

A content of F is 1.5-3.0%. F can facilitate crystallization, and it acts as an effective co-solvent; however, if its content is less than 1.5%, its effect in facilitating crystallization becomes weaker, and its co-solvent effect becomes weaker as well. On the other hand, if the content of F is more than 3.0%, the erosion of refractory lining in the furnace can be intense.

The crystallizable glass according to the invention is capable of being crystallized in a short period of time while maintaining its glass shape and its surface condition during the crystallization due to the aforesaid percentage composition.

Furthermore, as mentioned above, the crystallized glass according to the invention has excellent chemical durability because the total content of alkali-metal oxides, $Li_2O$, $Na_2O$, and $K_2O$, is low.

A crystallizable glass and a crystallized glass according to the invention may also contain BaO, $P_2O_5$, $Rb_2O$, $Cs_2O$, $MnO_2$, $Fe_2O_3$ in addition to the aforesaid components.

Preferably, a content of BaO is 0-5.0%. BaO acts as an effective co-solvent; however, if its content is more than 5.0%, it may be difficult to crystallize the glass.

Preferably, contents of $P_2O_5$, $Rb_2O$, $Cs_2O$, $MnO_2$, $Fe_2O_3$ are 0-0.2%, 0-0.8%, 0-0.2%, 0-0.3%, 0-0.2%, respectively. These components can be included in a mixture of glass raw materials by using the following lepidolite or lithium-containing waste as a glass raw material.

A crystallizable glass and a crystallized glass according to the invention may contain 1% or less of either $As_2O_3$ or $Sb_2O_3$ as a fining agent. Moreover, they may contain 3% or less $V_2O_5$, $Cr_2O_3$, $MnO_2$, $Fe_2O_3$, CoO, NiO, CuO or the like as a coloring agent.

Perferably, an amount of the lepidolite or the lithium-containing waste used as a glass raw material for the crystallizable glass and crystallized glass according to the invention is 25-50% by mass of the mixture of all glass raw materials used, wherein the lepidolite or the lithium-containing waste contains, by mass percent, 50.0-60.0% $SiO_2$, 20.0-30.0% $Al_2O_3$, 0-0.5% MgO, 3.0-5.0% $Li_2O$, 1.0-3.0% $Na_2O$, 6.0-9.0% $K_2O$, 4.0-6.0% F, 0-0.2% $P_2O_5$, 1.0-2.0% $Rb_2O$, 0.1-0.5% $Cs_2O$, 0.2-0.8% $MnO_2$, and 0.1-0.4% $Fe_2O_3$.

In the invention, a crystallizable glass and a crystallized glass may contain some or all of $SiO_2$, $Al_2O_3$, MgO, $Li_2O$, $Na_2O$, $K_2O$ and F by using the aforesaid lepidolite or lithium-containing waste as a glass raw material. Furthermore, the crystallizable glass and crystallized glass may contain $P_2O_5$, $Rb_2O$, $Cs_2O$, $MnO_2$, and $Fe_2O_3$.

Preferably, an amount of the aforesaid lepidolite or lithium-containing waste used as a glass raw material is 25-50% by mass of the mixture of glass raw materials. When the amount is more than 50%, it becomes difficult to adjust the composition of the mixture. If the amount is less than 25%, the manufacturing cost may not be effectively reduced.

Preferably, one or more crystals of $Ca(Mg,Al)(Si,Al)_2O_6$ (diopside), $MgSiO_3$ (enstatite), $MgSiO_3$ (clinoenstatite), $KCa_4Si_8O_{20}(OH)\cdot 8H_2O$ (hydroxyapophyllite), $K(Li,Al)_3$ $(Si,Al)_4O_{10}$ (lepidolite-3T), $K(Si_3Al)O_8$ (sanidine), $KMg_3$ $(Si_3Al)O_{10}(OH)_2$ (biotite-1M), $KMg_3(Si_3Al)O_{10}(OH)_2$ (phlogopite-2M1), and $KAl_2Si_3AlO_{10}(OH)_2$ (muscovite-1M) are included as primary crystals for a crystallized glass of the invention.

Since the crystallized glass according to the invention includes at least one type of the above crystals, it has excellent mechanical strength and an adequate thermal expansion coefficient that allows the crystallized glass to be used as a construction material.

The mechanical strength can be evaluated by three-point bending test. Preferably, the bending strength is 500-1000 $kg/cm^2$.

As for the thermal expansion coefficient, by taking into consideration its relationship with the thermal expansion coefficients of other construction materials used with the crystallized glass, the thermal expansion coefficient of the glass is preferably between $60\times10^{-7}/°C$ to $140\times10^{-7}/°C$.

Since a crystallized glass according to the invention has to be crystallized in a short period of time while maintaining its glass shape and its surface condition through the crystallization, it may preferably contain $Ca(Mg,Al)(Si,Al)_2O_6$ (diopside), $MgSiO_3$ (enstatite), $MgSiO_3$ (clinoenstatite), $KMg_3$ $(Si_3Al)O_{10}(OH)_2$ (biotite-1M), and $KMg_3(Si_3Al)O_{10}(OH)_2$ (phlogopite-2M1). More preferably, it may contain $Ca(Mg,Al)(Si,Al)_2O_6$(diopside), $MgSiO_3$ (enstatite), and $MgSiO_3$ (clinoenstatite).

B. Methods of Manufacturing Crystallizable Glass and Crystallized Glass

A method for manufacturing a crystallizable glass according to the invention includes: preparing a mixture of glass raw materials (step A); melting the mixture obtained in step A to give a melted glass (step B); and shaping the melted glass obtained in step B (step C).

Furthermore, a method for manufacturing a crystallized glass according to the invention includes the above three steps and further includes a step of performing a crystallization heating process on a crystallizable glass (step D).

Since the crystallizable glass according to the invention can be crystallized quickly while maintaining its glass shape and its surface condition through the crystallization, it can be used in manufacturing the crystallized glass according to the invention.

In methods of manufacturing a crystallizable glass and a crystallized glass according to the invention, a mixture of glass raw materials containing 55.0-65.0% $SiO_2$, 8.0-14.0% $Al_2O_3$, 10.0-20.0% MgO, 1.5-6.0% CaO, 1.0-2.2% $Li_2O$, 0.7-3.0% $Na_2O$, 2.5-4.0% $K_2O$, and 1.5-3.0% F may be used.

Lepidolite or a lithium-containing waste which contains 50.0-60.0% $SiO_2$, 20.0-30.0% $Al_2O_3$, 0-0.5% MgO, 3.0-5.0% $Li_2O$, 1.0-3.0% $Na_2O$, 6.0-9.0% $K_2O$, 4.0-6.0% F, 0-0.2% $P_2O_5$, 1.0-2.0% $Rb_2O$, 0.1-0.5% $Cs_2O$, 0.2-0.8% $MnO_2$, and 0.1-0.4% $Fe_2O_3$ can be used in the above mixture. For example, mining wastes from the excavation of rare metals can be used as the aforesaid waste.

Preferably, an amount of the above lepidolite or lithium-containing waste is 25-50% of the mixture of all the glass raw materials used. If the amount is more than 50%, it is difficult to adjust the composition of the mixture. If the amount is less than 25%, the manufacturing cost may not be effectively reduced. It is nice to use lepidolite or a lithium-containing waste in terms of environmental protection.

Each step of the methods for manufacturing a crystallizable glass and a crystallized glass according to the invention is described hereinafter.

Step A is a step of preparing a mixture of glass raw materials containing 55.0-65.0% $SiO_2$, 8.0-14.0% $Al_2O_3$, 10.0-20.0% MgO, 1.5-6.0% CaO, 1.0-2.2% $Li_2O$, 0.7-3.0% $Na_2O$, 2.5-4.0% $K_2O$, and 1.5-3.0% F.

When the above lepidolite or lithium-containing waste is used as a glass raw material, the lepidolite or the lithium-containing waste is stirred (step A-1), and then the stirred product is mixed with other glass raw materials to prepare the mixture of glass raw materials having the aforesaid percentage composition (step A-2).

In addition to the aforesaid components, the mixture of glass raw materials may further contain 0-0.2% $P_2O_5$, 0-0.8% $Rb_2O$, 0-0.2% $Cs_2O$, 0-0.3% $MnO_2$, and 0-0.2% $Fe_2O_3$ by using the above lepidolite or lithium-containing waste.

In the step A, an oxide of a transition element, such as $V_2O_5$, $Cr_2O_3$, $MnO_2$, $Fe_2O_3$, CoO, NiO, CuO, may be added as a coloring agent. $As_2O_3$ or $Sb_2O_3$ may be also added as a fining agent.

Step B is a step of melting the mixture obtained in the step A to give a melted glass. For example, a melted glass can be obtained by using conventional methods well known in the art via melting equipment, such as a crucible furnace, a day tank furnace or a tank furnace.

The melting temperature is not limited specifically, but can be 1400-1600° C., preferably 1450-1550° C.

Step C is a step of shaping (or forming) the melted glass obtained in the step B to give a crystallizable glass. The method of shaping the melted glass is not limited specifically, and the shaping methods well known in the art can be used. For example, the glass can be pressed into a band-like glass by a rolling process.

Step D is a step of performing a heating process on the crystallizable glass obtained in the step C, precipitating crystals and enabling the crystals to grow to obtain a crystallized glass. Preferably, at least one or more of $Ca(Mg,Al)(Si,Al)_2O_6$(diopside), $MgSiO_3$ (enstatite), $MgSiO_3$ (lcinoenstatite), $KCa_4Si_8O_{20}(OH).8H_2O$ (hydroxyapophyllite), $K(Li,Al)_3(Si,Al)_4O_{10}$ (lepidolite-3T), $K(Si_3Al)O_8$ (sanidine), $KMg_3(Si_3Al)O_{10}(OH)_2$ (biotite-1M), $KMg_3(Si_3Al)O_{10}(OH)_2$ (phlogopite-2M1), and $KAl_2Si_3AlO_{10}(OH)_2$ (muscovite-1M) may be precipitated through the crystallization heating process.

The heating rate, holding temperature and holding time of the crystallization heating process in the step D are not limited specifically, and adequate conditions can be selected to enable the crystals to be precipitated and grow completely. In view of productivity, it is preferable to provide a high heating rate and short holding time.

In a method for manufacturing a crystallized glass according to the invention, an annealing step performed before crystallization is not required. Therefore, a method according to the invention can utilize the continuous forming production method using the continuous forming process equipment disclosed in Japanese Patent Publication No. 2005-041726 to produce a crystallized glass, thereby simplifying the manufacturing process to reduce the cost.

Specifically, in a method for manufacturing a crystallized glass according to the invention using, for example, the continuous forming process equipment for producing a crystallized glass disclosed in the aforesaid Japanese Patent Publication, a mixture of glass raw materials is melted in a melting device; the melted glass flows through a devitrifying-prevention device at a predetermined rate controlled by a viscosity control device and a liquid-level control device. Then the melted glass is introduced into a rolling device to be pressed into a band-like glass. The band-like glass is automatically transferred to a crystallization device directly and continuously, and then crystallized by the crystallization device. The band-like crystallized glass is directly and continuously transferred to a cutting device and then automatically cut into plates of a predetermined length by the cutting device. In other words, in a preferable aspect, the steps from melting the mixture of glass raw materials to cutting the glass can be automatically performed continuously.

A crystallized glass obtained by a method for manufacturing a crystallized glass according to the invention can be used as a construction material and a surface material for furniture after undergoing subsequent processing, such as cutting, polishing, surface processing.

EXAMPLES

The following examples are provided to further illustrate the implementation of the invention. However, the scope of the invention is not limited to the given examples. Moreover, "%" indicates "mass percent", if not otherwise specified.

Lepidolite or a lithium-containing waste at 25-45% by mass of the mixture of glass raw materials is used in each example of the invention and comparative example to prepare various mixtures of glass raw materials having percentage compositions corresponding to samples recited in Table 1 and Table 2. Although the composition of the lepidolite or lithium-containing waste used may slightly vary between the samples due to acquisition at different times, it essentially includes the following contents.

$SiO_2$ . . . 53-58%
$Al_2O_3$ . . . 21-26%
MgO . . . 0-0.3%
$Li_2O$ . . . 3.2-4.6%
$Na_2O$ . . . 1.7-2.5%
$K_2O$ . . . 7.0-8.8%
F . . . 4.2-5.5%
$P_2O_5$ . . . 0.07-0.15%
$Rb_2O$ . . . 1.2-1.8%
$Cs_2O$ . . . 0.1-0.3%
$MnO_2$ . . . 0.3-0.7%
$Fe_2O_3$ . . . 0.15-0.35%

Example 1

A mixture of glass raw materials was prepared according to the percentage composition as shown in sample 1 of Table 1, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 650° C. at a rate of 360° C. per hour. After it was kept at 650° C. for 60 minutes, it was heated to 860° C. at a rate of 60° C. per hour. After it was kept at 860° C. for 30 minutes, it was cooled in the furnace.

As a result, a crystallized glass containing at least crystals of $Ca(Mg,Al)(Si,Al)_2O_6$(diopside), $MgSiO_3$ (enstatite), $MgSiO_3$ (clinoenstatite), $K(Li,Al)_3(Si,Al)_4O_{10}$(lepidolite- 3T), K(Si$_3$Al)O$_8$ (sanidine), KMg$_3$(Si$_3$Al)O$_{10}$(OH)$_2$ (biotite-1M), KMg$_3$(Si$_3$Al)O$_{10}$(OH)$_2$(phlogopite-2M1), and KAl$_2$Si$_3$AlO$_{10}$(OH)$_2$(muscovite-1M) was obtained. The appearance of the crystallized glass plate was nice and was white.

Example 2

A mixture of glass raw materials was prepared according to the percentage composition as shown in sample 2 of Table 1, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 650° C. at a rate of 360° C. per hour. After it was kept at 650° C. for 60 minutes, it was heated to 860° C. at a rate of 30° C. per hour. After it was kept at 860° C. for 60 minutes, it was cooled in the furnace.

As a result, a crystallized glass containing at least crystals of Ca(Mg,Al)(Si,Al)$_2$O$_6$ (diopside), MgSiO$_3$ (enstatite), MgSiO$_3$ (clinoenstatite), KCa$_4$Si$_8$O$_{20}$(OH).8H$_2$O (hydroxyapophyllite), K(Li,Al)$_3$(Si,Al)$_4$O$_{10}$(lepidolite-3T), K(Si$_3$Al)O$_8$ (sanidine), KMg$_3$(Si$_3$Al)O$_{10}$(OH)$_2$ (biotite-1M), KMg$_3$(Si$_3$Al)O$_{10}$(OH)$_2$(phlogopite-2M1), and KAl$_2$Si$_3$AlO$_{10}$(OH)$_2$ (muscovite-1M) was obtained. The appearance of the crystallized glass plate was nice and was white.

Example 3

A mixture of glass raw materials was prepared according to the percentage composition as shown in sample 3 of Table 1, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 700° C. at a rate of 360° C. per hour. After it was kept at 700° C. for 60 minutes, it was heated to 860° C. at a rate of 30° C. per hour. After it was kept at 860° C. for 60 minutes, it was cooled in the furnace.

As a result, a crystallized glass containing at least crystals of Ca(Mg,Al)(Si,Al)$_2$O$_6$(diopside), MgSiO$_3$ (enstatite), MgSiO$_3$ (clinoenstatite), KCa$_4$Si$_8$O$_{20}$(OH).8H$_2$O (hydroxyapophyllite), K(Li,Al)$_3$(Si,Al)$_4$O$_{10}$(lepidolite-3T), K(Si$_3$Al)O$_8$ (sanidine), KMg$_3$(Si$_3$Al)O$_{10}$(OH)$_2$ (biotite-1M), KMg$_3$(Si$_3$Al)O$_{10}$(OH)$_2$(phlogopite-2M1), and KAl$_2$Si$_3$AlO$_{10}$(OH)$_2$(muscovite-1M) was obtained. The appearance of the crystallized glass plate was nice and was white.

Example 4

A mixture of glass raw materials was prepared according to the percentage composition as shown in sample 4 of Table 1, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 700° C. at a rate of 360° C. per hour. After it was kept at 700° C. for 30 minutes, it was heated to 860° C. at a rate of 120° C. per hour. After it was kept at 860° C. for 30 minutes, it was cooled in the furnace.

As a result, a crystallized glass containing at least crystals of Ca(Mg,Al)(Si,Al)$_2$O$_6$(diopside), MgSiO$_3$ (enstatite), MgSiO$_3$ (clinoenstatite), K(Li,Al)$_3$(Si,Al)$_4$O$_{10}$(lepidolite-3T), K(Si$_3$Al)O$_8$ (sanidine), KMg$_3$(Si$_3$Al)O$_{10}$(OH)$_2$ (biotite-1M), KMg$_3$(Si$_3$Al)O$_{10}$(OH)$_2$(phlogopite-2M1), and KAl$_2$Si$_3$AlO$_{10}$(OH)$_2$(muscovite-1M) was obtained. The appearance of the crystallized glass plate was nice and was white.

Example 5

A mixture of glass raw materials was prepared according to the percentage composition as shown in sample 5 of Table 1, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 700° C. at a rate of 360° C. per hour. After it was kept at 700° C. for 30 minutes, it was heated to 900° C. at a rate of 120° C. per hour. After it was kept at 900° C. for 30 minutes, it was cooled in the furnace.

As a result, a crystallized glass containing at least crystals of Ca(Mg,Al)(Si,Al)$_2$O$_6$ (diopside), MgSiO$_3$ (enstatite), MgSiO$_3$ (clinoenstatite), K(Li,Al)$_3$(Si,Al)$_4$O$_{10}$(lepidolite-3T), K(Si$_3$Al)O$_8$ (sanidine), KMg$_3$(Si$_3$Al)O$_{10}$(OH)$_2$ (biotite-1M), KMg$_3$(Si$_3$Al)O$_{10}$(OH)$_2$ (phlogopite-2M1), and KAl$_2$Si$_3$AlO$_{10}$(OH)$_2$ (muscovite-1M) was obtained. The appearance of the crystallized glass plate was nice and was white.

Example 6

A mixture of glass raw materials was prepared according to the percentage composition as shown in sample 6 of Table 1, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 700° C. at a rate of 360° C. per hour. After it was kept at 700° C. for 30 minutes, it was heated to 900° C. at a rate of 60° C. per hour. After it was kept at 900° C. for 60 minutes, it was cooled in the furnace.

As a result, a crystallized glass containing at least crystals of Ca(Mg,Al)(Si,Al)$_2$O$_6$ (diopside), MgSiO$_3$ (enstatite), MgSiO$_3$ (clinoenstatite), K(Li,Al)$_3$(Si,Al)$_4$O$_{10}$(lepidolite-3T), K(Si$_3$Al)O$_8$ (sanidine), KMg$_3$(Si$_3$Al)O$_{10}$(OH)$_2$ (biotite-1M), KMg$_3$(Si$_3$Al)O$_{10}$(OH)$_2$ (phlogopite-2M1), and KAl$_2$Si$_3$AlO$_{10}$(OH)$_2$ (muscovite-1M) was obtained. The appearance of the crystallized glass plate was nice and was white.

Example 7

A mixture of glass raw materials was prepared according to the percentage composition as shown in sample 7 of Table 1, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 700° C. at a rate of 480° C. per hour. After it was kept at 700° C. for 30 minutes, it was heated to 920° C. at a rate of 120° C. per hour. After it was kept at 920° C. for 30 minutes, it was cooled in the furnace.

As a result, a crystallized glass containing at least crystals of Ca(Mg,Al)(Si,Al)$_2$O$_6$(diopside), MgSiO$_3$ (enstatite), MgSiO$_3$ (clinoenstatite), K(Li,Al)$_3$(Si,Al)$_4$O$_{10}$(lepidolite-3T), K(Si$_3$Al)O$_8$ (sanidine), KMg$_3$(Si$_3$Al)O$_{10}$(OH)$_2$(biotite-1M), KMg$_3$(Si$_3$Al)O$_{10}$(OH)$_2$(phlogopite-2M1), and KAl$_2$Si$_3$AlO$_{10}$(OH)$_2$ (muscovite-1M) was obtained. The appearance of the crystallized glass plate was nice and was white.

Example 8

A mixture of glass raw materials was prepared according to the percentage composition as shown in sample 8 of Table 1, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 700° C. at a rate of 360° C. per hour. After it was kept at 700° C. for 30 minutes, it was heated to 875° C. at a rate of 120° C. per hour. After it was kept at 875° C. for 60 minutes, it was cooled in the furnace.

As a result, a crystallized glass containing at least crystals of $MgSiO_3$ (enstatite), $MgSiO_3$ (clinoenstatite), $K(Li,Al)_3(Si,Al)_4O_{10}$(lepidolite-3T), $K(Si_3Al)O_8$ (sanidine), $KMg_3(Si_3Al)O_{10}(OH)_2$ (biotite-1M), $KMg_3(Si_3Al)O_{10}(OH)_2$ (phlogopite-2M1), and $KAl_2Si_3AlO_{10}(OH)_2$(muscovite-1M) was obtained. The appearance of the crystallized glass plate was nice and was white.

Example 9

A mixture of glass raw materials was prepared according to the percentage composition as shown in sample 9 of Table 1, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 650° C. at a rate of 300° C. per hour. After it was kept at 650° C. for 30 minutes, it was heated to 810° C. at a rate of 120° C. per hour. After it was kept at 810° C. for 30 minutes, it was cooled in the furnace.

As a result, a crystallized glass containing at least crystals of $Ca(Mg,Al)(Si,Al)_2O_6$(diopside), $MgSiO_3$ (enstatite), $MgSiO_3$ (clinoenstatite), $K(Li,Al)_3(Si,Al)_4O_{10}$(lepidolite-3T), $K(Si_3Al)O_8$ (sanidine), $KMg_3(Si_3Al)O_{10}(OH)_2$ (biotite-1M), $KMg_3(Si_3Al)O_{10}(OH)_2$(phlogopite-2M1), and $KAl_2Si_3AlO_{10}(OH)_2$(muscovite-1M) was obtained. The appearance of the crystallized glass plate was nice and was white.

Example 10

A mixture of glass raw materials was prepared according to the percentage composition as shown in sample 10 of Table 1, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 700° C. at a rate of 600° C. per hour. After it was kept at 700° C. for 30 minutes, it was heated to 910° C. at a rate of 120° C. per hour. After it was kept at 910° C. for 30 minutes, it was cooled in the furnace.

As a result, a crystallized glass containing at least crystals of $Ca(Mg,Al)(Si,Al)_2O_6$ (diopside), $MgSiO_3$ (enstatite), $MgSiO_3$ (clinoenstatite), $K(Si_3Al)O_8$ (sanidine), $KMg_3(Si_3Al)O_{10}(OH)_2$ (biotite-1M), $KMg_3(Si_3Al)O_{10}(OH)_2$ (phlogopite-2M1), and $KAl_2Si_3AlO_{10}(OH)_2$ (muscovite-1M) was obtained. The appearance of the crystallized glass plate was nice and was white.

Comparative Example 1

A mixture of glass raw materials was prepared according to the percentage composition as shown in sample 11 of Table 2, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 700° C. at a rate of 600° C. per hour. After it was kept at 700° C. for 30 minutes, it was heated to 910° C. at a rate of 120° C. per hour. After it was kept at 910° C. for 30 minutes, it was cooled in the furnace.

As a result, a crystallized glass containing at least crystals of $MgSiO_3$ (enstatite), $MgSiO_3$ (clinoenstatite), $K(Li,Al)_3(Si,Al)_4O_{10}$(lepidolite-3T), $K(Si_3Al)O_8$ (sanidine), $KMg_3(Si_3Al)O_{10}(OH)_2$ (biotite-1M), $KMg_3(Si_3Al)O_{10}(OH)_2$ (phlogopite-2M1), and $KAl_2Si_3AlO_{10}(OH)_2$ (muscovite-1M) was obtained. The appearance of the crystallized glass plate was nice and was white.

However, the glass was deformed during the crystallization heating process. Therefore, it was inadequate to be produced by the continuous forming production method.

Comparative Example 2

A mixture of glass raw materials was prepared according to the percentage composition as shown in sample 12 of Table 2, and then added into a crucible. The mixture was melted at 1580° C., and then formed into a 250 mm*250 mm*18 mm plate. After the glass plate was cooled, it was transferred to a heating furnace, kept at 200° C. for 10 minutes, and then heated to 700° C. at a rate of 300° C. per hour. After it was kept at 700° C. for 60 minutes, it was heated to 880° C. at a rate of 120° C. per hour. After it was kept at 880° C. for 60 minutes, it was cooled in the furnace.

As a result, a crystallized glass containing at least crystals of $MgSiO_3$ (enstatite), $MgSiO_3$ (clinoenstatite), $K(Si_3Al)O_8$ (sanidine), $KMg_3(Si_3Al)O_{10}(OH)_2$ (biotite-1M), $KMg_3(Si_3Al)O_{10}(OH)_2$(phlogopite-2M1), and $KAl_2Si_3AlO_{10}(OH)_2$ (muscovite-1M) was obtained. The crystallized glass plate was white.

However, the glass cracked during the crystallization heating process. Therefore, no product was obtained.

Comparative Example 3

A mixture of glass raw materials was prepared according to the percentage composition as shown in sample 13 of Table 2, and then added into a crucible. The mixture was melted at 1580° C., and then formed into a 250 mm*250 mm*18 mm plate. After the glass plate was cooled, it was transferred to a heating furnace, kept at 200° C. for 10 minutes, and then heated to 700° C. at a rate of 300° C. per hour. After it was kept at 700° C. for 30 minutes, it was heated to 860° C. at a rate of 60° C. per hour. After it was kept at 860° C. for 60 minutes, it was cooled in the furnace.

As a result, a crystallized glass containing at least crystals of $Ca(Mg,Al)(Si,Al)_2O_6$ (diopside), $MgSiO_3$ (enstatite), $MgSiO_3$ (clinoenstatite), and $KCa_4Si_8O_{20}(OH)\cdot 8H_2O$ (hydroxyapophyllite) was obtained. The crystallized glass plate was white.

However, the glass cracked during the crystallization heating process. Therefore, no product was obtained.

Comparative Example 4

A mixture of glass raw materials was prepared according to the percentage composition as shown in sample 14 of Table 2, and then added into a crucible. The mixture was melted at 1580° C., and then formed into a 250 mm*250 mm*18 mm plate. After the glass plate was cooled, it was transferred to a heating furnace, kept at 200° C. for 10 minutes, and then heated to 720° C. at a rate of 300° C. per hour. After it was kept at 720° C. for 30 minutes, it was heated to 980° C. at a rate of 60° C. per hour. After it was kept at 980° C. for 30 minutes, it was cooled in the furnace.

As a result, a crystallized glass containing at least crystals of $MgSiO_3$ (enstatite), $MgSiO_3$ (clinoenstatite), $K(Si_3Al)O_8$ (sanidine), $KMg_3(Si_3Al)O_{10}(OH)_2$ (biotite-1M), $KMg_3(Si_3Al)O_{10}(OH)_2$ (phlogopite-2M1), and $KAl_2Si_3AlO_{10}(OH)_2$ (muscovite-1M) was obtained. The crystallized glass plate was white.

However, the glass cracked during the crystallization heating process. Therefore, no product was obtained.

Comparative Example 5

A mixture of glass raw materials was prepared according to the percentage composition as shown in sample 15 of Table 2, and then added into a crucible. The mixture was melted at 1580° C., and then formed into a 250 mm*250 mm*18 mm plate. After the glass plate was cooled, it was transferred to a heating furnace, kept at 200° C. for 10 minutes, and then heated to 720° C. at a rate of 300° C. per hour. After it was kept at 720° C. for 30 minutes, it was heated to 880° C. at a rate of 60° C. per hour. After it was kept at 880° C. for 30 minutes, it was cooled in the furnace.

As a result, most crystals were not precipitated, and the crystallized glass plate was translucent.

Moreover, the glass was deformed and cracked during the crystallization heating process. Therefore, no product was obtained.

Comparative Example 6

A mixture of glass raw materials was prepared according to the percentage composition as shown in sample 16 of Table 2, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 650° C. at a rate of 300° C. per hour. After it was kept at 650° C. for 30 minutes, it was heated to 860° C. at a rate of 120° C. per hour. After it was kept at 860° C. for 30 minutes, it was cooled in the furnace.

As a result, a crystallized glass containing at least crystals of $Ca(Mg,Al)(Si,Al)_2O_6$ (diopside), $MgSiO_3$ (enstatite), $MgSiO_3$ (clinoenstatite), $K(Li,Al)_3(Si,Al)_4O_{10}$(lepidolite-3T), $K(Si_3Al)O_8$ (sanidine), $KMg_3(Si_3Al)O_{10}(OH)_2$ (biotite-1M), $KMg_3(Si_3Al)O_{10}(OH)_2$ (phlogopite-2M1), $KAl_2Si_3AlO_{10}(OH)_2$ (muscovite-1M) and $LiAlSi_2O_6$(β-spodumene) was obtained. The appearance of the crystallized glass plate was nice and was white.

However, since the crystal of $LiAlSi_2O_6$(β-spodumene) was precipitated besides the target crystals, the thermal expansion coefficient of the glass becomes lower, thereby the glass was inadequate to be used as a construction material.

Comparative Example 7

A mixture of glass raw materials was prepared according to the percentage composition as shown in sample 17 of Table 2, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 650° C. at a rate of 360° C. per hour. After it was kept at 650° C. for 60 minutes, it was heated to 840° C. at a rate of 60° C. per hour. After it was kept at 840° C. for 30 minutes, it was cooled in the furnace.

As a result, a crystallized glass containing at least crystals of $Ca(Mg,Al)(Si,Al)_2O_6$ (diopside), $MgSiO_3$ (enstatite), $MgSiO_3$ (clinoenstatite), $K(Li,Al)_3(Si,Al)_4O_{10}$(lepidolite-3T), $K(Si_3Al)O_8$ (sanidine), $KMg_3(Si_3Al)O_{10}(OH)_2$ (biotite-1M), $KMg_3(Si_3Al)O_{10}(OH)_2$ (phlogopite-2M1), and $KAl_2Si_3AlO_{10}(OH)_2$ (muscovite-1M) was obtained. The appearance of the crystallized glass plate was nice and was white.

However, the glass was deformed during the crystallization heating process. Therefore, it was inadequate to be produced by the continuous forming production method.

Comparative Example 8

A mixture of glass raw materials was prepared according to the percentage composition as shown in sample 18 of Table 2, and then added into a crucible. The mixture was melted at 1550° C., and then formed into a 250 mm*250 mm*18 mm plate. After the glass plate was cooled, it was transferred to a heating furnace, kept at 200° C. for 10 minutes, and then heated to 650° C. at a rate of 360° C. per hour. After it was kept at 650° C. for 60 minutes, it was heated to 830° C. at a rate of 60° C. per hour. After it was kept at 830° C. for 30 minutes, it was cooled in the furnace.

As a result, a crystallized glass containing at least crystals of $Ca(Mg,Al)(Si,Al)_2O_6$ (diopside), $MgSiO_3$ (enstatite), $MgSiO_3$ (clinoenstatite), $K(Li,Al)_3(Si,Al)_4O_{10}$ (lepidolite-3T), $K(Si_3Al)O_8$ (sanidine), $KMg_3(Si_3Al)O_{10}(OH)_2$ (biotite-1M), $KMg_3(Si_3Al)O_{10}(OH)_2$ (phlogopite-2M1), and $KAl_2Si_3AlO_{10}(OH)_2$ (muscovite-1M) was obtained. The appearance of the crystallized glass plate was nice and was white.

However, the glass was deformed during the crystallization heating process. Therefore, it was inadequate to be produced by the continuous forming production method.

Comparative Example 9

A mixture of glass raw materials was prepared according to the percentage composition as shown in sample 19 of Table 2, and then added into a crucible. The mixture was melted at 1580° C., and then formed into a 250 mm*250 mm*18 mm plate. After the glass plate was cooled, it was transferred to a heating furnace, kept at 200° C. for 10 minutes, and then heated to 700° C. at a rate of 120° C. per hour. After it was kept at 700° C. for 60 minutes, it was heated to 950° C. at a rate of 120° C. per hour. After it was kept at 950° C. for 120 minutes, it was cooled in the furnace.

As a result, a crystallized glass containing at least crystals of $MgSiO_3$ (enstatite), $MgSiO_3$ (clinoenstatite), $K(Li,Al)_3(Si,Al)_4O_{10}$(lepidolite-3T), $K(Si_3Al)O_8$ (sanidine), $KMg_3(Si_3Al)O_{10}(OH)_2$ (biotite-1M), $KMg_3(Si_3Al)O_{10}(OH)_2$ (phlogopite-2M1), and $KAl_2Si_3AlO_{10}(OH)_2$ (muscovite-1M) was obtained. The appearance of the crystallized glass plate was nice and was beige.

However, the glass could not be crystallized in a short period of time. In addition, it was deformed and cracked during the crystallization heating process. Therefore, no product was obtained.

Table 1 and Table 2 show the percentage composition, crystal phase, crystal growth temperature/time, mechanical strength, color, thermal expansion coefficient, acid resistance, and alkali resistance of the samples of examples 1-10 and comparative examples 1-9.

The crystal phases A-I recited in Tables 1 and 2 indicate the following crystals, respectively:
A: $Ca(Mg,Al)(Si,Al)_2O_6$ (diopside)
B: $MgSiO_3$ (enstatite)
C: $MgSiO_3$ (clinoenstatite)
D: $KCa_4Si_8O_{20}(OH)\cdot 8H_2O$ (hydroxyapophyllite)
E: $K(Li,Al)_3(Si,Al)_4O_{10}$ (lepidolite-3T)
F: $K(Si_3Al)O_8$ (sanidine)
G: $KMg_3(Si_3Al)O_{10}(OH)_2$ (biotite-1M)
H: $KMg_3(Si_3Al)O_{10}(OH)_2$ (phlogopite-2M1)
I: $KAl_2Si_3AlO_{10}(OH)_2$ (muscovite-1M)

Here the type of crystal is evaluated by x-ray diffraction.

The mechanical strength is determined by three-point bending strength testing device.

The color is evaluated by visual inspection.

As for the thermal expansion coefficient, a crystallized glass sample sized 20 mm*5 mm*5 mm is used for measuring the average coefficient of linear thermal expansion within a range of 30-400° C.

A crystallized glass sample sized 1.5 mm*1.5 mm*10 mm is immersed in 1% $H_2SO_4$ or 1% NaOH for 650 hours at 25, and then its weight loss (by mass percent) is used to determine its acid resistance and alkali resistance.

The tests on mechanical strength, thermal expansion coefficient, acid resistance and alkali resistance are not performed on the samples cracked or broken during the crystallization heating process.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Sample No. | 1 | 2 | 3 | 4 | 5 | 6 | 7 | 8 | 9 | 10 |
| $SiO_2$ | 59.6 | 57.1 | 56.6 | 56.6 | 60.8 | 63.8 | 59.4 | 56.3 | 59.6 | 61.2 |
| $Al_2O_3$ | 11.4 | 11.4 | 11.4 | 11.4 | 11.9 | 11.9 | 11.4 | 8.3 | 11.4 | 14.0 |
| MgO | 11.4 | 11.4 | 14.4 | 11.4 | 14.4 | 11.4 | 13.6 | 19.8 | 13.3 | 11.0 |
| CaO | 3.5 | 6.0 | 3.5 | 3.5 | 3.5 | 3.5 | 1.5 | 1.5 | 3.5 | 4.0 |
| $Li_2O$ | 1.7 | 1.7 | 1.7 | 1.7 | 1.2 | 1.2 | 1.7 | 1.7 | 1.7 | 1.2 |
| $Na_2O$ | 3.0 | 3.0 | 3.0 | 3.0 | 3.0 | 3.0 | 3.0 | 3.0 | 1.1 | 3.0 |
| $K_2O$ | 3.7 | 3.7 | 3.7 | 3.7 | 2.6 | 2.6 | 3.7 | 3.7 | 3.7 | 2.6 |
| F | 2.5 | 2.5 | 2.5 | 2.5 | 1.8 | 1.8 | 2.5 | 2.5 | 2.5 | 1.8 |
| BaO | 2.0 | 2.0 | 2.0 | 5.0 | 0.0 | 0.0 | 2.0 | 2.0 | 2.0 | 0.0 |
| $P_2O_5$ | 0.07 | 0.07 | 0.07 | 0.07 | 0.05 | 0.05 | 0.07 | 0.07 | 0.07 | 0.07 |
| $Rb_2O$ | 0.66 | 0.66 | 0.66 | 0.66 | 0.46 | 0.46 | 0.66 | 0.66 | 0.66 | 0.66 |
| $Cs_2O$ | 0.10 | 0.10 | 0.10 | 1.10 | 0.07 | 0.07 | 0.10 | 0.10 | 0.10 | 0.10 |
| $MnO_2$ | 0.23 | 0.23 | 0.23 | 0.23 | 0.14 | 0.14 | 0.23 | 0.23 | 0.23 | 0.23 |
| $Fe_2O_3$ | 0.14 | 0.14 | 0.14 | 0.14 | 0.08 | 0.08 | 0.14 | 0.14 | 0.14 | 0.14 |
| Crystal phase | A, B, C, E, F, G, H, I | A, B, C, D, E, F, G, H, I | A, B, C, D, E, F, G, H, I | A, B, C, E, F, G, H, I | A, B, C, E, F, G, H, I | A, B, C, E, F, G, H, I | A, B, C, E, F, G, H, I | B, C, E, F, G, H, I | A, B, C, E, F, G, H, I | A, B, C, F, G, H, I |
| Crystal growth temp./time | 860° C. 30 min. | 860° C. 60 min. | 860° C. 60 min. | 860° C. 30 min. | 900° C. 30 min. | 900° C. 60 min. | 920° C. 30 min. | 875° C. 60 min. | 810° C. 30 min. | 910° C. 30 min. |
| Mechanical strength ($kg/cm^2$) | 631 | 946 | 767 | 773 | 702 | 708 | 530 | 669 | 500 | 520 |
| Color | white | white | white | white | white | white | white | white | white | white |
| Thermal expansion coefficient* $10^{-7}/°$ C. (30-400° C.) | 82 | 85 | 89 | 88 | 92 | 90 | 89 | 93 | 88 | 90 |
| Acid resistance (mass %) | 0.01 | 0.03 | 0.02 | 0.01 | 0.01 | 0.01 | 0.01 | 0.03 | 0.01 | 0.03 |
| Alkali resistance (mass %) | 0.02 | 0.01 | 0.01 | 0.02 | 0.01 | 0.01 | 0.03 | 0.03 | 0.04 | 0.02 |

TABLE 2

|  | Compar. Ex. 1 | Compar. Ex. 2 | Compar. Ex. 3 | Compar. Ex. 4 | Compar. Ex. 5 | Compar. Ex. 6 | Compar. Ex. 7 | Compar. Ex. 8 | Compar. Ex. 9 |
|---|---|---|---|---|---|---|---|---|---|
| Sample No. | 11 | 12 | 13 | 14 | 15 | 16 | 17 | 18 | 19 |
| $SiO_2$ | 52.2 | 67.1 | 64.6 | 60.7 | 63.6 | 58.8 | 59.1 | 58.8 | 59.4 |
| $Al_2O_3$ | 11.4 | 8.0 | 7.5 | 14.4 | 11.0 | 11.4 | 11.4 | 11.4 | 11.4 |
| MgO | 18.3 | 14.0 | 11.5 | 11.0 | 9.0 | 13.3 | 11.4 | 11.4 | 13.3 |
| CaO | 1.5 | 1.5 | 4.0 | 1.5 | 4.0 | 3.5 | 3.5 | 3.5 | 0.7 |
| $Li_2O$ | 1.7 | 1.2 | 1.2 | 1.2 | 1.2 | 2.5 | 1.7 | 1.7 | 1.7 |
| $Na_2O$ | 3.0 | 3.0 | 3.0 | 3.0 | 3.0 | 1.1 | 3.5 | 3.0 | 1.1 |
| $K_2O$ | 3.7 | 2.6 | 2.6 | 2.6 | 2.6 | 3.7 | 3.7 | 4.5 | 3.7 |
| F | 2.0 | 1.8 | 1.8 | 1.8 | 1.8 | 2.5 | 2.5 | 2.5 | 2.5 |
| BaO | 5.0 | 0.0 | 3.0 | 3.0 | 3.0 | 2.0 | 2.0 | 2.0 | 5.0 |
| $P_2O_5$ | 0.07 | 0.05 | 0.05 | 0.05 | 0.05 | 0.07 | 0.07 | 0.07 | 0.07 |
| $Rb_2O$ | 0.66 | 0.44 | 0.44 | 0.44 | 0.44 | 0.66 | 0.66 | 0.66 | 0.66 |
| $Cs_2O$ | 0.10 | 0.07 | 0.07 | 0.07 | 0.07 | 0.10 | 0.10 | 0.10 | 0.10 |

TABLE 2-continued

|  | Compar. Ex. 1 | Compar. Ex. 2 | Compar. Ex. 3 | Compar. Ex. 4 | Compar. Ex. 5 | Compar. Ex. 6 | Compar. Ex. 7 | Compar. Ex. 8 | Compar. Ex. 9 |
|---|---|---|---|---|---|---|---|---|---|
| $MnO_2$ | 0.23 | 0.16 | 0.16 | 0.16 | 0.16 | 0.23 | 0.23 | 0.23 | 0.23 |
| $Fe_2O_3$ | 0.14 | 0.08 | 0.08 | 0.08 | 0.08 | 0.14 | 0.14 | 0.14 | 0.14 |
| Crystal phase | B, C, E, F, G, H, I | B, C, F, G, H, I | A, B, C D | B, C, F, G, H, I | β-spodumene | A, B, C, E, F, G, H, I | A, B, C, E, F, G, H, I | A, B, C, E, F, G, H, I | B, C, E, F, G, H, I |
| Crystal growth temp./time | 910° C. 30 min. | 880° C. 60 min. | 860° C. 60 min. | 980° C. 30 min. | 880° C. 30 min. | 860° C. 30 min. | 840° C. 30 min. | 830° C. 30 min. | 950° C. 120 min. |
| mechanical strength ($kg/cm^2$) | 885 | — | — | — | — | 530 | 650 | 680 | — |
| Color | white | white | white | white | translucent | white | white | white | beige |
| Thermal expansion coefficient* $10^{-7}$/° C. (30-400° C.) | 91 | — | — | — | — | 40 | 87 | 90 | — |
| Acid resistance (mass %) | 0.035 | — | — | — | — | 0.02 | 0.02 | 0.02 | — |
| Alkali resistance (mass %) | 0.02 | — | — | — | — | 0.03 | 0.01 | 0.01 | — |

As shown in Tables 1 and 2, the crystallized glass of the invention can be crystallized in a short period of time, have high mechanical strength, adequate thermal expansion coefficient that allows the crystallized glass to be used as a construction material, and good chemical durability.

What is claimed is:

1. A $MgO$—$Al_2O_3$—$SiO_2$-based crystallized glass, comprising, by mass percent, 55.0-65.0% $SiO_2$, 8.0-14.0% $Al_2O_3$, 10.0-20.0% $MgO$, 1.5-6.0% $CaO$, 1.0-2.2% $Li_2O$, 0.7-3.0% $Na_2O$, 2.5-4.0% $K_2O$, and 1.5-3.0% F,
    wherein lepidolite or a lithium-containing waste is used as a raw material for the crystallized glass, an amount of the lepidolite or the lithium-containing waste is 25-50% by mass of all raw materials used for the crystallized glass, and the lepidolite or the lithium-containing waste comprises, by mass percent, 50.0-60.0% $SiO_2$, 20.0-30.0% $Al_2O_3$ 0-0.5% $MgO$, 3.0-5.0% $Li_2O$, 1.0-3.0% $Na_2O$, 6.0-9.0% $K_2O$, 4.0-6.0% F, 0-0.2% $P_2O_5$, 1.0-2.0% $Rb_2O$, 0.1-0.5% $Cs_2O$, 0.2-0.8% $MnO_2$, and 0.1-0.4% $Fe_2O_3$.

2. The crystallized glass of claim 1, comprising at least one or more crystals of $Ca(Mg,Al)(Si,Al)_2O_6$ (diopside), $MgSiO_3$ (enstatite), $MgSiO_3$ (clinoenstatite), $KCa_4Si_8O_{20}(OH)\cdot 8H_2O$ (hydroxyapophyllite), $K(Li,Al)_3(Si,Al)_4O_{10}$ (lepidolite-3T), $K(Si_3Al)O_8$ (sanidine), $KMg_3(Si_3Al)O_{10}(OH)_2$ (biotite-1M), $KMg_3(Si_3Al)O_{10}(OH)_2$ (phlogopite-2M1), and $KAl_2Si_3AlO_{10}(OH)_2$ (muscovite-1M).

* * * * *